United States Patent [19]

Hannah et al.

[11] Patent Number: 5,774,788
[45] Date of Patent: Jun. 30, 1998

[54] REMOTE GROUND TERMINAL HAVING AN OUTDOOR UNIT WITH A FREQUENCY-MULTIPLIER

[75] Inventors: Robert Hannah; Nadeem Bukhari, both of Germantown, Md.

[73] Assignee: Hughes Electronics, Los Angeles, Calif.

[21] Appl. No.: 405,688

[22] Filed: Mar. 17, 1995

[51] Int. Cl.$^6$ .............................. H04B 7/185; H04B 7/19; H04B 7/195

[52] U.S. Cl. .......................... 458/12.1; 455/3.2; 455/112

[58] Field of Search .................................. 455/3.1, 12.1, 455/53.1, 112, 116, 118, 127, 20, 22, 507

[56]  References Cited

U.S. PATENT DOCUMENTS

| 3,789,302 | 1/1974 | Rearwin et al. | 455/112 |
|---|---|---|---|
| 4,475,242 | 10/1984 | Rafal et al. | 455/3.1 |
| 4,509,198 | 4/1985 | Nagatomi | 455/3.2 |
| 4,592,093 | 5/1986 | Ouchi et al. | 455/3.2 |
| 4,785,306 | 11/1988 | Adams | 343/786 |
| 4,932,070 | 6/1990 | Waters et al. | 455/10 |
| 5,208,829 | 5/1993 | Soleimani et al. | 455/12.1 |
| 5,309,479 | 5/1994 | Cheah | 375/62 |
| 5,376,941 | 12/1994 | Fukazawa et al. | |
| 5,392,450 | 2/1995 | Nossen | 455/12.1 |
| 5,454,009 | 9/1995 | Fruit et al. | 375/202 |
| 5,578,972 | 11/1996 | Hadden et al. | 333/135 |
| 5,589,837 | 12/1996 | Soleimani et al. | 342/359 |
| 5,606,290 | 2/1997 | Pang | 331/1 A |
| 5,608,761 | 3/1997 | Opas et al. | 375/296 |

OTHER PUBLICATIONS

S. Kumar et al. "Direct Generation of MSK Modulation at Microwave Frequencies", Conference 1981 IEEE MTT-S International Microwave Symposium Digest, Los Angeles, CA, USA.

Yoshiteru Morihiro et al., "A 100 MBit/s Prototype MSK Modem for Satellite Communications,"IEEE Transactions on Communications, vol. COM-27, No. 10 (Oct. 1979).

U.S. Patent Application Serial No. 08/523,309, "Low Cost Very Small Aperture Satellite Terminal," filed Sep. 5, 1995.

Primary Examiner—Reinhard J. Eisenzopf
Assistant Examiner—Gertrude Arthur
Attorney, Agent, or Firm—Wanda Denson-Low; John T. Whelan

[57] ABSTRACT

A remote ground terminal for generating and transmitting a modulated data signal to a satellite. The remote ground terminal the remote ground terminal includes an indoor unit for generating a modulated data signal having an envelope of constant amplitude, and an outdoor unit including a transmitter module operative to receive the modulated data signal and to frequency multiply and amplify the modulated data signal so as to produce a modulated carrier signal having an envelope of constant amplitude. The transmitter module includes an active FET multiplier operative to frequency multiply the modulated data signal to the frequency of the modulated carrier signal, and a power amplifier operated in the saturation mode, which amplifies the modulated carrier signal to the desired power level. The components constituting the transmitter module are formed on a single integrated circuit.

20 Claims, 4 Drawing Sheets

REMOTE GROUND TERMINAL HAVING AN OUTDOOR UNIT WITH A FREQUENCY-MULTIPLIER

BACKGROUND OF THE INVENTION

Satellite communication systems typically have employed large aperture antennas and high power transmitters for establishing an uplink to the satellite. Recently, however, very small aperture antenna ground terminals, referred to as remote ground terminals, have been developed for data transmission at low rates. In such systems, the remote ground terminals are utilized for communicating via a satellite from a remote location to a central hub station. The central hub station communicates with multiple remote ground terminals, and has a significantly larger antenna, as well as a significantly larger power output capability than any of the remote ground terminals.

Very small aperture terminal (VSAT) remote terminal can be used to communicate data, voice and video, to or from a remote site to a central hub. Typically, the VSAT remote terminals have a small aperture directional antenna for receiving from or transmitting signals to a satellite, and an outdoor unit (ODU) mounted near the antenna for transmitting a modulated carrier generated by an indoor unit (IDU). The IDU demodulates incoming signals received from the ODU and also operates as an interface between a user's communication equipment and the ODU.

The viability of the remote ground terminal concept increases as the cost for providing a remote ground terminal at the remote location decreases. In pursuit of this objective, various techniques have been utilized to reduced the cost of the remote ground terminal. For example, U.S. Pat. No. 5,208,829 describes a spread spectrum technique that maximizes the power output from a satellite so as to allow a cost saving reduction in the size of the antenna of the remote ground terminal. U.S. Pat. No. 5,309,479 describes a remote ground terminal comprising a low cost transmitter for producing an FSK (frequency-shift keying) modulated uplink signal which is utilized to communicate with the central hub station via the satellite.

Notwithstanding these cost saving techniques, a problem remains that in prior art remote ground terminals, typically, the outdoor unit contains circuitry for generating a PSK (phase-shift keying) modulated data signal, linear upconverters for frequency converting the modulated data signal to the required transmit frequency and a linear power amplifier for amplifying the modulated data signal prior to transmission via the antenna. Such circuitry presents numerous drawbacks.

For example, the upconversion of the modulated data signal utilizing linear upconverters generates spurious signals in the outdoor unit which operate to increase the noise component of the output signal transmitted to the satellite. In order to prevent such an increase in noise, costly shielding techniques must be employed. The use of linear upconverters to frequency convert the modulated data signal also contributes to the generation of unwanted spurious signals due to the fact that linear upconverters typically contain local oscillators which operate in conjunction with mixers to perform the frequency multiplication.

Furthermore, the use of linear upconverters and linear power amplifiers, utilized to frequency convert and amplify the modulated data signal, is expensive and requires additional circuitry for controlling the performance characteristics of these components which vary due to, for example, variations in temperature. As the outdoor unit must operate over a wide temperature range, all components utilized therein must be temperature insensitive or rendered so via the design. Such temperature compensation techniques substantially add to the cost of the outdoor unit.

Accordingly, in order to reduce the cost and increase the efficiency of remote ground terminals, there exists a need for a remote ground terminal comprising an outdoor unit which does not require the use of linear upconverters or a linear power amplifier to modulate the uplink signal. There is also a need to minimize the number of components contained in the outdoor unit so as to render the outdoor unit temperature insensitive in a cost effective manner.

SUMMARY OF THE INVENTION

The present invention provides an outdoor unit of a remote ground terminal designed to satisfy the aforementioned needs. Specifically, the present invention provides a novel design for the remote ground terminal which eliminates the need for the transmitter module to contain a linear upconverter or a linear power amplifier, so as to substantially reduce the overall cost of the remote ground terminal relative to prior art designs. The design of the transmitter module also minimizes the outdoor unit's sensitivity to changes in temperature.

Accordingly, the present invention relates to a remote ground terminal for generating and transmitting a modulated carrier signal to a satellite. In the preferred embodiment, the remote ground terminal comprises an indoor unit for generating a modulated data signal having an envelope of constant amplitude, and an outdoor unit comprising a transmitter module operative to receive the modulated data signal and to frequency multiply and amplify the modulated data signal so as to produce a modulated carrier signal having an envelope of constant amplitude.

The transmitter module comprises an active FET multiplier operative to frequency multiply the modulated data signal to the required transmit frequency, and a power amplifier operated in the saturation mode, which amplifies the modulated carrier signal to the desired power level. The components constituting the transmitter module are formed on a single integrated circuit.

The present invention also relates to a method for generating and transmitting a modulated carrier signal to a satellite. The method comprises generating a modulated data signal having an envelope of constant amplitude in an indoor unit, coupling the modulated data signal to an outdoor unit via a cable, frequency multiplying the modulated data signal to the required transmit frequency, and amplifying the modulated carrier signal to a predetermined power level.

As described below, the remote ground terminal of the present invention provides important advantages. For example, the design of the transmitter module of the present invention results in an increase in operational efficiency of the outdoor unit, a reduction in overall size of the outdoor unit and a reduction in DC power consumption by the outdoor unit, which substantially lowers the cost of the outdoor unit of the present invention.

The invention itself, together with further objects and attendant advantages, will best be understood by reference to the following detailed description, taken in conjunction with the accompanying drawings.

DETAILED DESCRIPTION OF THE DRAWINGS

Figure 1:
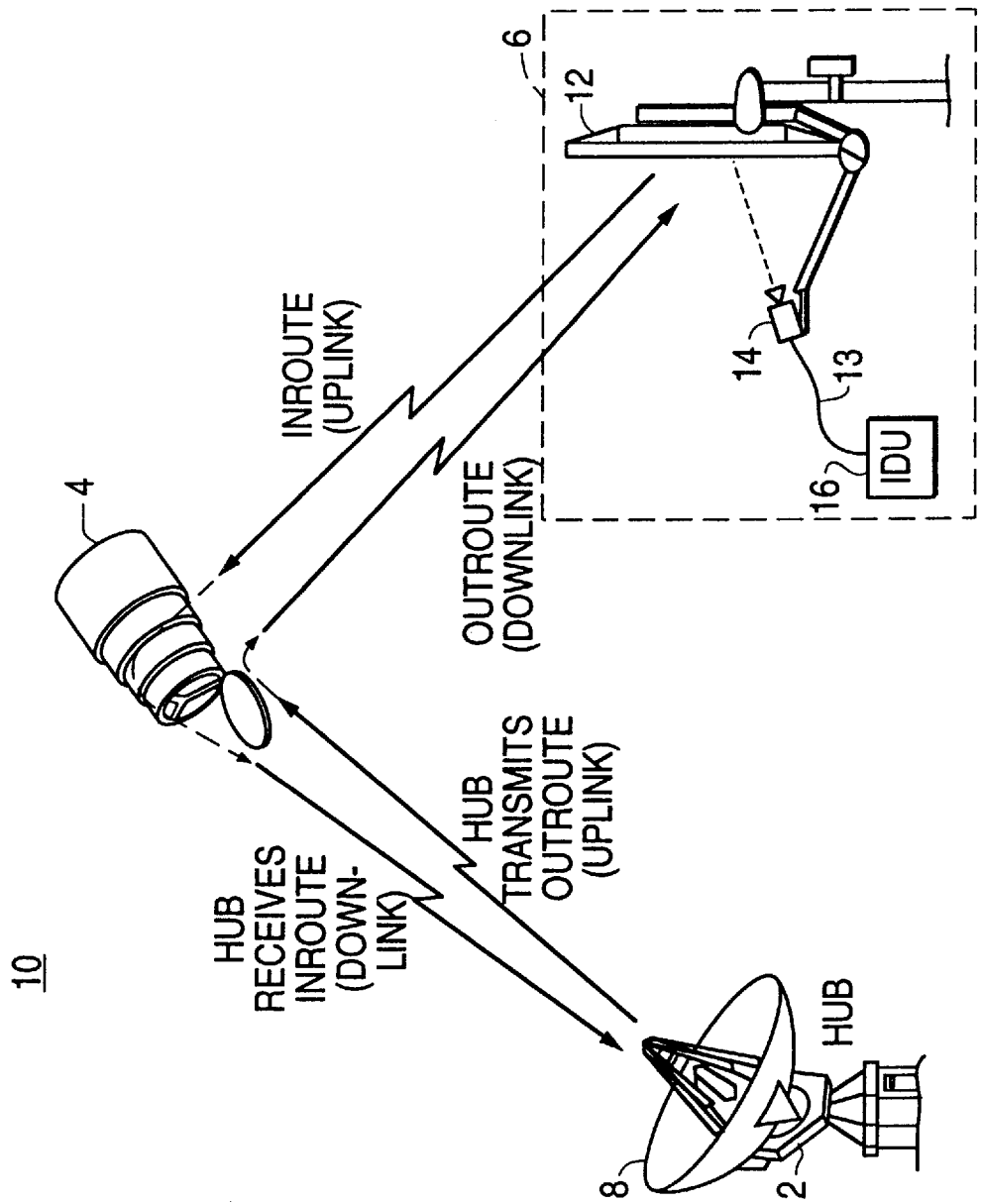
FIG. 1 is a block diagram of a very small aperture terminal ("VSAT") satellite communication network which utilizes the present invention.

The VSAT satellite communication network 10 illustrated in FIG. 1, comprises a central hub station 2, a communication satellite 4, and a plurality of remote ground terminals 6 (only one is shown). The VSAT network 10 functions as a two way transmission system for transferring data and voice communications between the central hub station 2 and the numerous remote ground terminals 6. All data is transferred between the central hub station 2 and the remote ground terminals 6 via transponders located in the satellite 4. Signals transmitted from the central hub station 2 to the remote ground terminal 6 are referred to as "outroute", while signals transmitted in the opposite direction are referred to as "inroute".

As stated, the central hub station 2 supports a plurality of remote ground terminals 6. The central hub station 2 comprises a large antenna 8 so as to allow for the transmission of a signal sufficiently strong such that the signal can be received by the remote ground terminals 6 which have relatively small antennas. The large antenna 8 of the central hub station 2 also compensates for the relatively weak signals transmitted by the remote ground terminals 6.

As shown in FIG. 1, the communication satellite 4 functions as a microwave relay. It receives signals from both the central hub station 2 and the remote ground terminals 6 at a first frequency and then retransmits the signal at a second frequency. The satellite 4 comprises a transponder which receives, amplifies and retransmits each signal within a predefined bandwidth. The transponders of the VSAT network 10 shown in FIG. 1 can operate in various frequency bands, for example, Ku and C band.

The remote ground terminal 6 comprises a small aperture antenna 12 for receiving (i.e., downlink) and transmitting (i.e., uplink) signals, an outdoor unit 14 typically mounted proximate the antenna 12 which comprises a transmitter module for amplifying and frequency multiplying a modulated data signal which is coupled to the antenna 12, and an indoor unit 16 which operates as an interface between a specific user's communication equipment and the outdoor unit 14. The indoor unit 16 also generates the modulated data signal which is amplified and frequency multiplied by the transmitter module of the outdoor unit. The transmitter module comprises an input buffer amplifier followed by a frequency multiplier, a filter and a saturated power amplifier. On/off control circuitry is also incorporated to allow the ODU to operate in a burst mode/time division multiple access (TDMA) mode.

During normal operation, the indoor unit 16 receives data from the user's equipment (not shown in FIG. 1) and modulates a reference signal in accordance with this data so as to produce the modulated data signal. As explained below, the modulation scheme utilized is such that the modulated data signal comprises an envelope having a constant amplitude. This modulated data signal is then transferred to the outdoor unit 14. The transmitter module of the outdoor unit 14 functions to amplify and frequency multiply the modulated data signal so as to produce a modulated carrier signal.

The modulated carrier signal is then coupled to the antenna 12 via a waveguide and feedhorn, and then transmitted to the satellite 4. Upon receipt by the central hub station 2, the modulated carrier signal is demodulated such that the data transmitted from the remote user is reproduced and processed by the central hub station 2.

The indoor unit 16 also supplies the outdoor unit 14 with a DC power signal and a carrier on/off signal. Both of these signals are multiplexed with the modulated data signal and transferred to the outdoor unit 14 as a single signal via an interfacility link 13, which in the preferred embodiment is a single cable.

Figure 2:
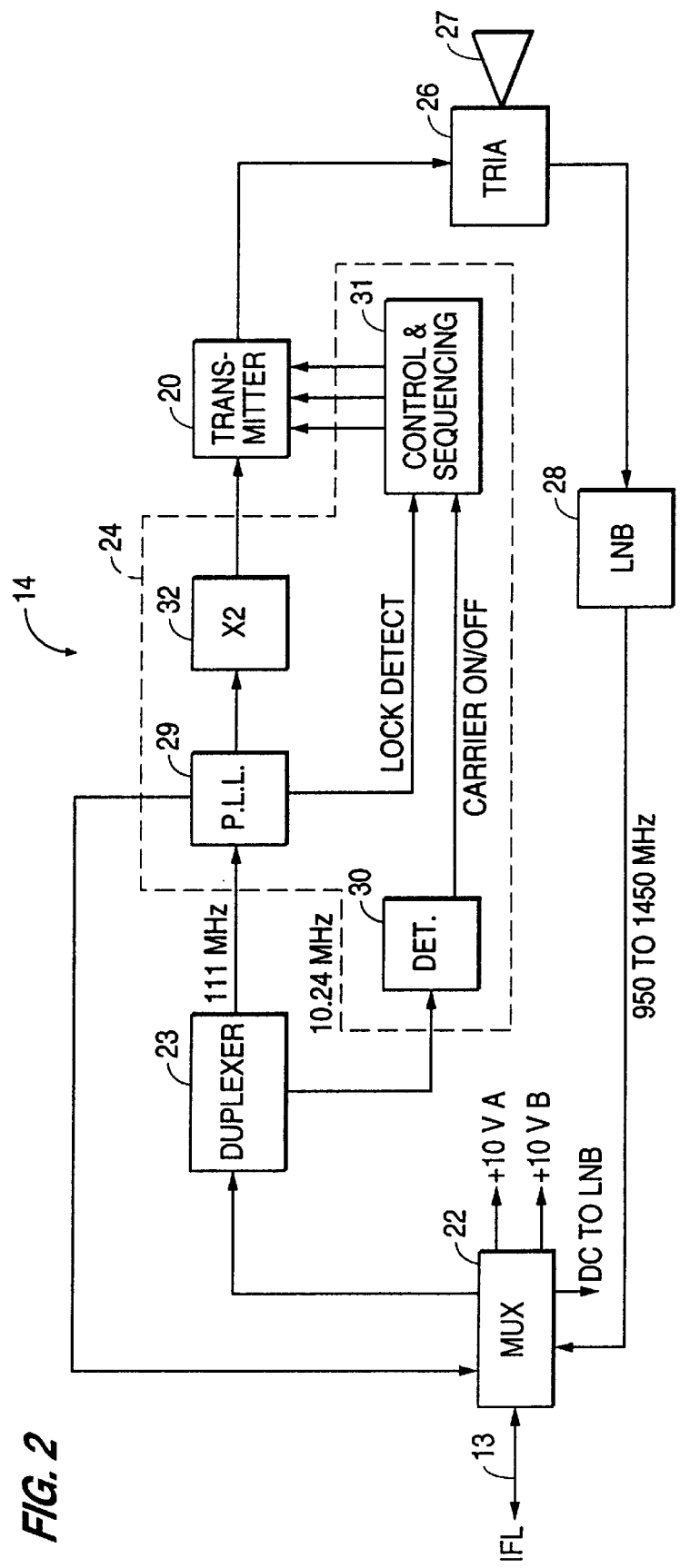
FIG. 2 is a block diagram illustrating the preferred embodiment of the outdoor unit of the present invention.

FIG. 2 is a block diagram of the outdoor unit 14 of the present invention. A shown in FIG. 2, the outdoor unit 14 of the present invention comprises a multiplexer 22 for receiving the modulated data signal from the indoor unit 16, a duplexer 23 for separating the modulated data signal and the carrier on/off signal received from the indoor unit 16, a main transmit module 24 for frequency stabilizing and multiplying the modulated data signal, a transmitter module 20 for amplifying and frequency multiplying the modulated data signal to generate a modulated carrier signal, and a transmit receive isolation assembly ("TRIA") 26. The output of the TRIA assembly 26 is coupled to the antenna 12 via a feedhorn 27. The antenna 12 then transmits the modulated carrier signal to the satellite 4.

The outdoor unit 14 also comprises a receiver chain for receiving the downlink signal from the satellite 4. The receiver chain comprises a low noise block downconverter 28 which transforms the received signal into a corresponding intermediate frequency signal. This signal is then coupled to the indoor unit 16, where it is further demodulated so as recreate the transmitted data. In one embodiment, the low noise block downconverter 28 comprises a low noise amplifier, and a mixer and local oscillator for downconverting the frequency of the received signal. The frequency of the local oscillator is selected in accordance with the desired frequency of the intermediate frequency signal.

The operation of the remote ground terminal of the present is as follows. As stated above, the multiplexer 22 of the outdoor unit 14 receives a multiplexed signal from the indoor unit 16. This multiplexed signal provides the modulated data signal having a frequency of approximately 111 Mhz, DC power and the carrier on/off signal having a frequency of approximately 10.24 Mhz. The multiplexer 22 couples the modulated data signal and the carrier on/off signal to the duplexer 23, and couples the DC power signal to the various components of the outdoor unit 14.

The duplexer 23 functions to separate the modulated data signal and the carrier on/off signal, and couple these signals to different components of the main transmit module 24 of the outdoor unit 14. As shown in FIG. 2, the modulated data signal is coupled to an input of a phase lock loop 29, and the carrier on/off signal is coupled to a detector 30. In one embodiment, the duplexer 23 comprises a low pass filter and a high pass filter each of which receives the multiplexed signal from the multiplexer 22 as an input. The outputs of the low and high pass filters are coupled to the inputs of the detector 30 and the phase lock loop 29, respectively.

The detector 30 functions to detect the presence or absence of the carrier on/off signal, and to produce an output signal if the carrier is presently being transmitted. In one embodiment, the detector 30 comprises an amplitude detector, for example, a diode detector, which produces a substantially level DC output signal when the carrier on/off signal is received by the detector 30. Other modulation techniques can be utilized to indicate the presence of the carrier signal. Of course, the detector 30 must be modified to detect the modulation technique utilized.

The output of the detector 30 is coupled to the control and sequencing unit 31. The control and sequencing unit 31 is coupled to the transmitter module 20 and functions to either enable or disable the transmitter module 20 in accordance with the presence or absence of the carrier on/off signal. In one embodiment, the control and sequencing unit 31 comprises a switch coupling the power supply with an input power line of the transmitter module 20. The switch comprises an input control port which is coupled to the output of the detector 30. Accordingly, if the detector 30 outputs a signal indicating the carrier on/off signal is present, the switch is enabled so that the input power line of the transmitter module 20 receives power and generates an modulated carrier signal which is subsequently transmitted to the satellite 4 via the antenna 12. Alternatively, if the detector output indicates the carrier on/off signal is not present, the switch is disabled so that transmitter module 20 does not receive power, thereby preventing the transmission of a modulated carrier signal.

As stated above, the 111 Mhz modulated data signal output by the duplexer 23 is coupled to the input of the phase lock loop 29 of the main transmit module 24. The phase lock loop 29 is a standard phase lock loop comprising, for example, a phase detector having one input for receiving the 111 Mhz signal, a low pass filter coupled to the output of the phase comparator, a voltage controlled oscillator coupled to the output of the low pass filter, and a frequency divider coupled to the output of the voltage controlled oscillator. The output of the frequency divider is coupled to a second input of the phase detector so as to complete the loop. The output of the phase lock loop 29 is taken from the output of the voltage controlled oscillator.

In the first embodiment, the frequency divider is selected such that phase lock loop 29 multiplies the frequency of the 111 Mhz signal by approximately a factor of 16 so as to produce a data modulated signal of a first intermediate frequency. This signal is then coupled to a frequency multiplier 32 which multiplies the signal by a factor of 2. In one embodiment, the frequency multiplier 32 comprises a gallium arsenide FET coupled to a bandpass filter which is tuned to the second harmonic of the first intermediate frequency signal. The output of the frequency multiplier 32 is coupled to the input of the transmitter module 20.

The phase lock loop 29 also comprises means for disabling the transmitter module 20. Specifically, if the phase lock loop 29 does not receive the 111 Mhz frequency or receives a signal having an improper frequency, which can be detected by monitoring the output level of the phase comparator, the phase lock loop 29 produces an output signal, referred to as a lock detect signal. The lock detect signal, which for example can be a TTL logic signal, is coupled to the control and sequencing unit 31.

As with the output of the detector 30, the lock detect signal functions to control a switch in the control and sequencing unit 31, which either couples or isolates the transmitter module 20 from the power supply. Specifically, if the lock detect signal is present (e.g. logic high) the input power line of the transmitter module 20 is coupled to the power supply and therefore generates a modulated carrier signal. If the lock detect signal is not present (e.g. logic low) indicating the phase lock loop 29 has lost lock, the input power line of the transmitter module 20 is isolated from the power supply and therefore disabled. In one embodiment, the control and sequencing unit 31 comprises an AND gate which receives the lock detect signal and the signal output by the detector 30 as inputs. The output of the AND gate is then coupled to the input of the switch coupling the input power line of the transmitter module 30 to the power supply.

Figure 3:
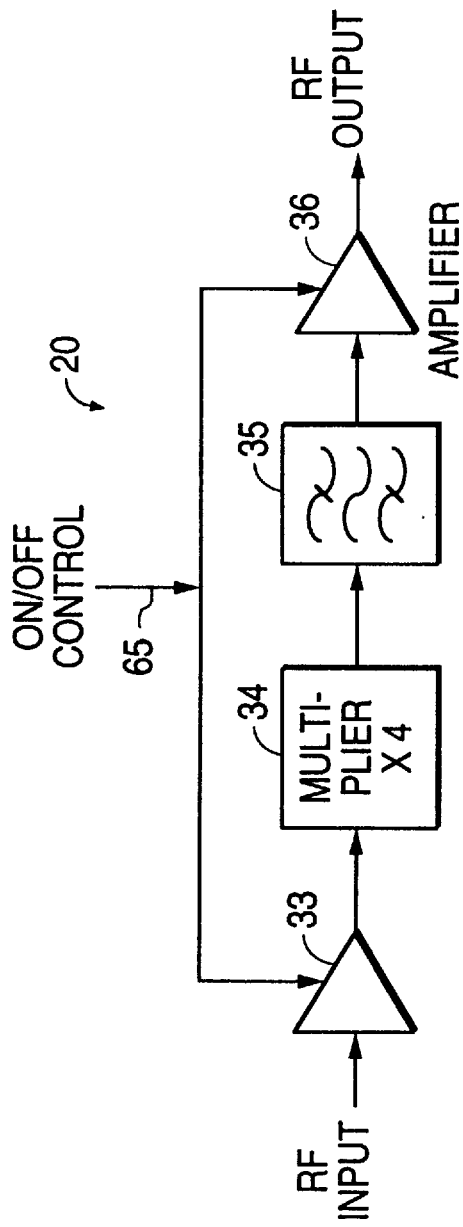
FIG. 3 is a block diagram illustrating the components of the preferred embodiment of the transmitter module of the present invention.

As stated, the input of the transmitter module 20 is coupled to the output of the frequency multiplier 32 of the main transmit module 24. The transmitter module 20 functions to amplify and frequency multiply the signal output by the frequency multiplier 32 so as to produce a modulated carrier signal suitable for transmission to the satellite 4. As shown in FIG. 3, in the preferred embodiment, the transmitter module 20 comprises an input buffer 33, a frequency multiplier 34, for example, a gallium arsenide FET, which multiplies the second intermediate frequency by a factor of 4, a bandpass filter 35 tuned to the frequency of the carrier signal and an amplifier 36, operated in the saturation mode, for amplifying the output of the frequency multiplier 34 of the transmitter module 20, which are all coupled in a series configuration. Furthermore, in the preferred embodiment, the transmitter module 20 is formed as a single integrated circuit assembly.

As stated, in the preferred embodiment, the modulation scheme utilized to generate the modulated data signal creates a signal having a constant envelope amplitude so as to allow for the use of a saturated amplifier 36. For example, a minimum shift keying (MSK) technique can be utilized to modulate the data signals in the indoor unit 16. The minimum shift keying modulation technique provides a modulated carrier signal having a constant amplitude envelope and a continuous phase waveform. As a result, only the phase of the carrier signal is modulated and a high power non-linear amplifier (i.e., saturated) can be utilized to amplify the modulated carrier signal.

As shown in FIG. 3, the transmitter module 20 also comprises a control line 65 which either enables or disables the transmitter module 20 from generating a modulated carrier signal. For example, in the present embodiment, the control line 65 either couples or isolates the input buffer 33 and the amplifier 36 from a power supply in accordance with the signals received by the control and sequencing unit 31, as discussed above.

Returning to FIG. 2, the output of the transmitter module 20 is coupled to the TRIA assembly 26 via a waveguide, and subsequently to the antenna 12 which is coupled to the output of the TRIA assembly 26. The modulated carrier signal is transmitted to the satellite 4 via this transmission chain.

The TRIA assembly 26 also receives downlink signals from the antenna 12. These downlink signals have a different polarization than the modulated carrier signal produced by the transmitter module 20 and are prevented from entering the transmitter module 20 by the TRIA assembly 26. The TRIA assembly 26 does however couple the downlink signals to the low noise block downconverter 28 which downconverts the incoming signal to an intermediate frequency. The downconverted signal is coupled to the multiplexer 22 and then transferred to the indoor unit 16 via the interfacility link 13.

Figure 4:
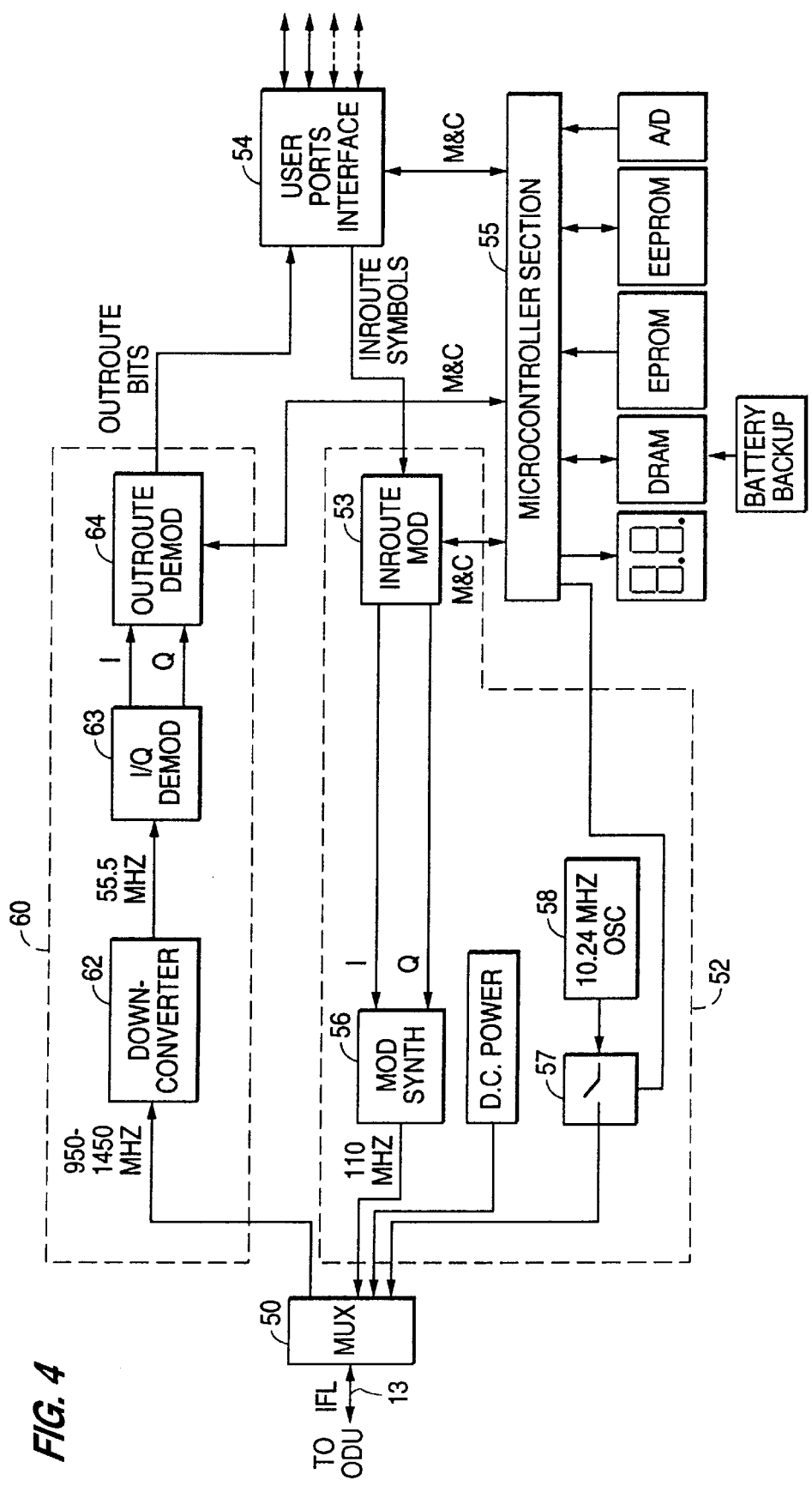
FIG. 4 is a schematic diagram of one embodiment of an indoor unit of the VSAT satellite communication network of FIG. 1.

FIG. 4 illustrates one embodiment of the indoor unit 16 of the VSAT network 10 of FIG. 1. As shown in FIG. 4, the indoor unit 16 comprises a multiplexer 50 having an input/output port which is coupled to the multiplexer 22 of the outdoor unit 14 via the interfacility link 13. The multiplexer 50 of the indoor unit 16 operates to combine the 111 Mhz modulated data signal, the 10.24 Mhz carrier signal and the DC power signal, prior to transferring these signals to the outdoor unit 14. The multiplexer 50 also operates to receive the incoming downlink signals transferred to the indoor unit 16 by the outdoor unit 14.

The indoor unit 16 further comprises a signal generation section 52 which functions to produce the 111 Mhz modulated data signal, the 10.24 Mhz carrier signal and the DC power signal. As shown in FIG. 4, data signals (i.e., inroute symbols) received from the user's equipment via a user interface 54 are transferred to an inroute modulator 53. Under control of a microcontroller 55 contained in the indoor unit 16, the inroute modulator 53 generates I and Q (i.e., quadrature) modulation signals which are coupled to a modulation synthesizer circuit 56. The modulation synthesizer circuit 56 functions to produce a 111 Mhz signal modulated in accordance with the I and Q modulation data. As stated above, the modulation technique utilized, such as MSK, produces a modulated data signal having a constant amplitude. The 111 Mhz modulated data signal is coupled to the multiplexer 50.

The microcontroller 55 also governs when the 10.24 Mhz carrier on/off signal is coupled to the multiplexer 50. In one embodiment, as shown in FIG. 4, the microcontroller 55 controls a switch 57 which when activated couples the carrier on/off signal to the multiplexer 50. As shown, the carrier on/off signal is generated by a local oscillator 58 having a frequency of 10.24 Mhz. Accordingly, the microcontroller 55 enables this switch 57 upon receiving data from the user's equipment that is to be transmitted to the hub station 2.

The indoor unit 16 also comprises a demodulator section 60 which receives the incoming downlink signals transferred via the outdoor unit 14. As shown in FIG. 4, the demodulator section 60 comprises a downconverter 62 which further reduces the frequency of the downlink signal. The output of the downconverter 62 is coupled to an I/Q demodulator 63 which functions to divide the downlink signals into I and Q quadrature signals. The quadrature signals are then coupled to an outroute demodulator circuit 64 which analyzes the I and Q signals so as to recreate the data bits transmitted by the hub station 2.

As indicated above, the flow of data within the indoor unit 16 is governed by the microcontroller 55, which interfaces with both the signal generation section 52 and the demodulator section 60, as well as the user interface 54 which functions to couple the indoor unit 16 to the user's equipment.

The remote ground terminal of the present invention provides numerous advantages. For example, the design of the transmitter module of the present invention eliminates the need for linear upconverters, a synthesized or fixed frequency local oscillator source and a linear power amplifier. As a result, the outdoor unit exhibits an increase in operational efficiency, a reduction in overall size and a reduction in DC power consumption, which leads to a substantially lower cost outdoor unit in comparison to the prior art units.

Numerous variations of the foregoing invention are also possible. For example, while the operational frequencies described above relate to a transmitter module designed to operate in the Ku frequency band, the foregoing invention can be utilized in units operating in various frequency bands, such as the C band.

Of course, it should be understood that a wide range of other changes and modifications can be made to the preferred embodiment described above. It is therefore intended that the foregoing detailed description be regarded as illustrative rather than limiting and that it be understood that it is the following claims, including all equivalents, which are intended to define the scope of the invention.

What is claimed is:

1. A remote ground terminal for generating and transmitting a modulated carrier signal to a satellite, said apparatus comprising:
   an indoor unit for generating a modulated data signal having an envelope of constant amplitude; and
   an outdoor unit comprising a phase-locked loop coupled to a transmitter module which are operative to receive said modulated data signal and to frequency multiply and amplify said modulated data signal so as to produce a modulated carrier signal having an envelope of constant amplitude.

2. The remote ground terminal for generating and transmitting a modulated carrier signal to a satellite according to claim 1, wherein said phase-locked loop multiplies said modulated data signal to an intermediate frequency and said transmitter module comprises an active FET multiplier operative to frequency multiply said modulated data signal from said intermediate frequency to the frequency of said modulated carrier signal.

3. The remote ground terminal for generating and transmitting a modulated carrier signal to a satellite according to claim 2, wherein said active FET multiplier comprises a gallium arsenide FET.

4. The remote ground terminal for generating and transmitting a modulated carrier signal to a satellite according to claim 2, wherein said transmitter module comprises a bandpass filter having an input port coupled to an output port of said active FET multiplier, said bandpass filter tuned to the frequency of said modulated carrier signal.

5. The remote ground terminal for generating and transmitting a modulated carrier signal to a satellite according to claim 4, wherein said transmitter module further comprises a power amplifier which is operated in a saturation mode.

6. The remote ground terminal for generating and transmitting a modulated carrier signal to a satellite according to claim 5, wherein said power amplifier comprises an input port coupled to an output port of said bandpass filter, said power amplifier operative to receive said modulated carrier signal and to amplify the same to the desired power level.

7. A remote ground terminal for generating and transmitting a modulated carrier signal to a satellite according to claim 6, wherein said modulated carrier signal is in the Ku frequency band.

8. A remote ground terminal for generating and transmitting a modulated carrier signal to a satellite according to claim 6, wherein said active FET multiplier, said bandpass filter and said power amplifier are formed on a single integrated circuit.

9. A method for generating and transmitting a modulated carrier signal to a satellite comprising:
   generating a modulated data signal having an envelope of constant amplitude in an indoor unit,
   coupling the modulated data signal to an outdoor unit via a cable,
   frequency multiplying the modulated data signal to the frequency of said modulated carrier signal using a phase-locked loop in an outdoor unit, and
   amplifying said modulated carrier signal to a predetermined power level.

10. The method for generating and transmitting a modulated carrier signal to a satellite according to claim 9, wherein said frequency multiplying of said modulated data signal and the amplification of said modulated carrier signal are performed by the phase-locked loop and by a transmitter module that has components contained in a single integrated circuit disposed in the outdoor unit.

11. The method for generating and transmitting a modulated carrier signal to a satellite according to claim 9, wherein said frequency multiplication is performed by an active FET multiplier in addition to the phase-locked loop.

12. The method for generating and transmitting a modulated carrier signal to a satellite according to claim 11, wherein said active FET multiplier comprises a gallium arsenide FET.

13. The method for generating and transmitting a modulated carrier signal to a satellite according to claim 11, further comprising coupling an output of said active FET multiplier to an input port of a bandpass filter, said bandpass filter tuned to the frequency of said modulated carrier signal.

14. The method for generating and transmitting a modulated carrier signal to a satellite according to claim 13, further comprising coupling an output port of said bandpass filter to an input port of an amplifier, said amplifier operative to amplify said modulated carrier signal to a predetermined power level.

15. The method for generating and transmitting a modulated carrier signal to a satellite according to claim 14, wherein said amplifier is operated in the saturated mode.

16. The method for generating and transmitting a modulated carrier signal to a satellite according to claim 10, wherein said modulated carrier signal is in the Ku frequency band.

17. The remote ground terminal for generating and transmitting a modulated carrier signal to a satellite according to claim 2, wherein said phase-locked loop produces a lock-detect signal and said transmitter module includes a control circuit which disables the FET multiplier in response to the absence of said lock-detect signal.

18. The method for generating and transmitting a modulated carrier signal to a satellite according to claim 9, wherein said step of frequency multiplying uses a transmitter module to frequency multiply an output of said phase-locked loop and further including the steps of determining whether the phase-locked loop locks onto the modulated data signal and disabling the transmitter module when the phase-locked loop fails to lock onto the modulated data signal.

19. A remote ground terminal for generating and transmitting a modulated carrier signal to a satellite, said terminal comprising:

a signal generating unit for generating a modulated data signal having an envelope of constant amplitude;

a phase-locked loop that frequency multiplies the modulated data signal to an intermediate frequency; and a frequency multiplier that frequency multiplies the modulated data signal at the intermediate frequency to produce the modulated carrier signal having an envelope of constant amplitude.

20. The remote ground terminal for generating and transmitting a modulated carrier signal to a satellite according to claim 19, wherein said signal generating unit is located in an indoor unit, said phase-locked loop and said frequency multiplier are located in an outdoor unit and said signal generating unit and said phase-locked loop are coupled together via a cable.

* * * * *